United States Patent [19]

Blackburn

[11] Patent Number: 5,895,016
[45] Date of Patent: Apr. 20, 1999

[54] MULTI-USE RADIO INSTALLATION KIT

[76] Inventor: James A. Blackburn, 20721 Cantara St., Winnetka, Calif. 91306

[21] Appl. No.: 09/046,054

[22] Filed: Mar. 23, 1998

Related U.S. Application Data

[62] Division of application No. 08/685,985, Jul. 22, 1996, Pat. No. 5,791,606.

[51] Int. Cl.[6] ........................................ G12B 9/10
[52] U.S. Cl. ...................... 248/27.1; 455/345; 361/814; 361/679
[58] Field of Search .................. 248/27.1, 27.3, 248/544, 558; 312/7.1, 242, 245; 455/345, 90, 347; 361/814, 829, 752, 679, 826

[56] References Cited

U.S. PATENT DOCUMENTS

| | | | |
|---|---|---|---|
| 4,062,470 | 12/1977 | Boteler | 248/27.1 X |
| 4,462,564 | 7/1984 | Alves et al. | 248/27.1 |
| 4,699,341 | 10/1987 | Ponticelli | 248/27.1 |
| 4,738,420 | 4/1988 | Angle et al. | 248/27.1 |
| 4,742,978 | 5/1988 | Ponticelli | 248/27.1 |
| 4,868,715 | 9/1989 | Putman et al. | 248/27.1 X |
| 5,106,039 | 4/1992 | Gross | 248/27.1 |
| 5,228,652 | 7/1993 | Ponticelli et al. | 248/27.1 |
| 5,408,385 | 4/1995 | Fowler et al. | 361/752 X |

*Primary Examiner*—Derek J. Berger
*Assistant Examiner*—Stephen S. Wentsler
*Attorney, Agent, or Firm*—David O'Reilly

[57] ABSTRACT

A radio installation kit for automobiles comprising a frame with rearward facing walls, mounting plates which snap onto the frame and mounting brackets formed on the plates at predetermined positions. Mounting plates with brackets at predetermined positions may be assembled with the frame providing a great variety of bracket positions that allow maximum vehicle application coverage. All of the components are constructed with out the need for expensive slide tooling.

2 Claims, 16 Drawing Sheets

FIGURE 12
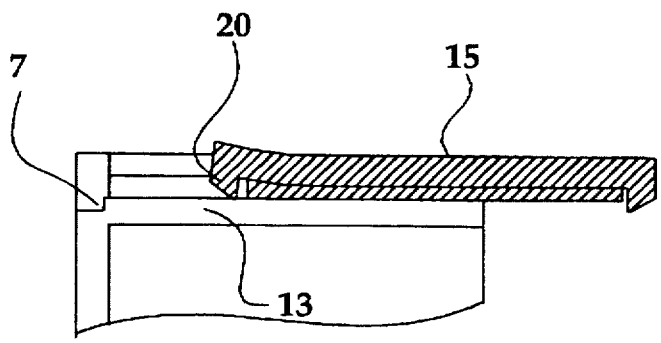
FIGURE 13
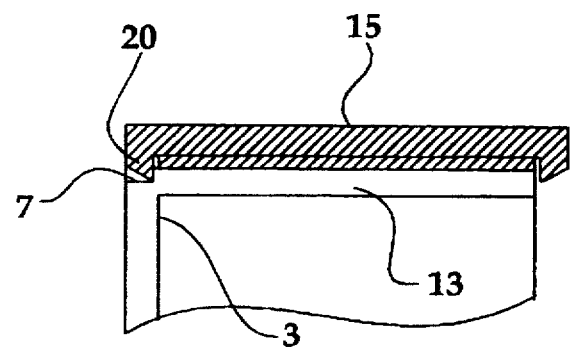
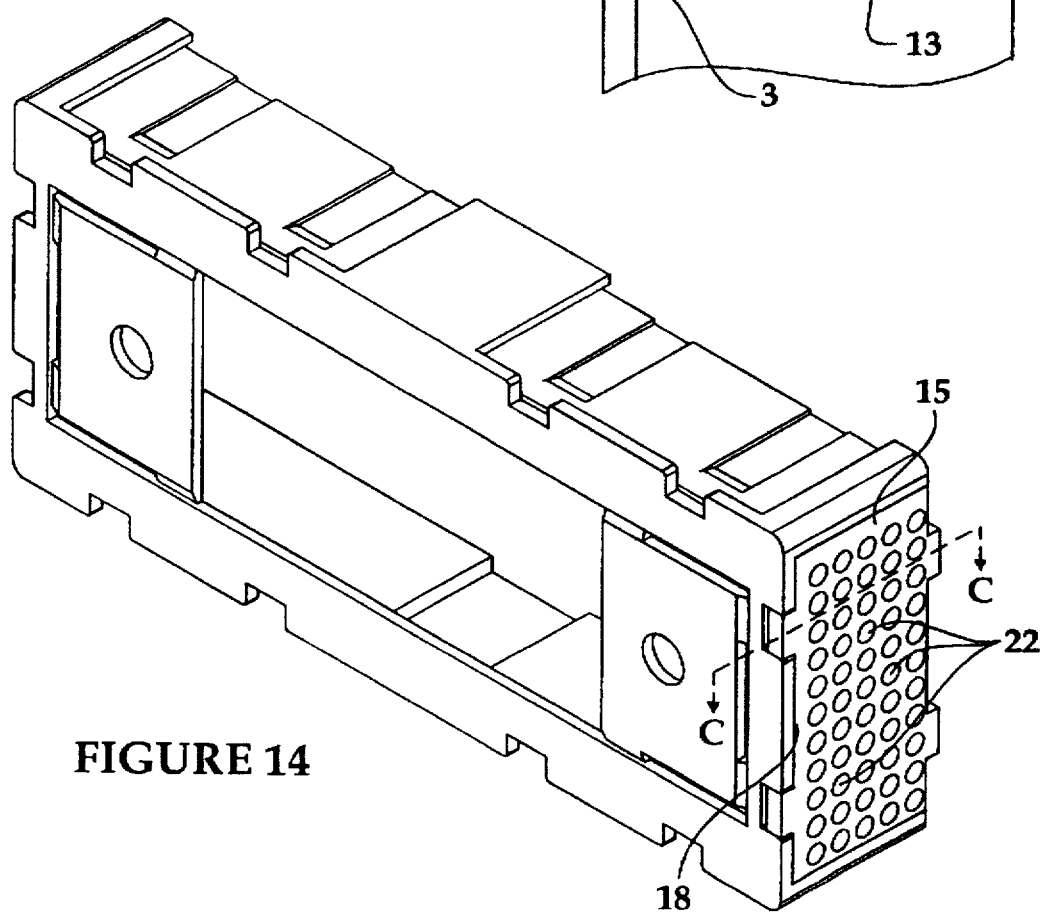
FIGURE 14

FIGURE 19
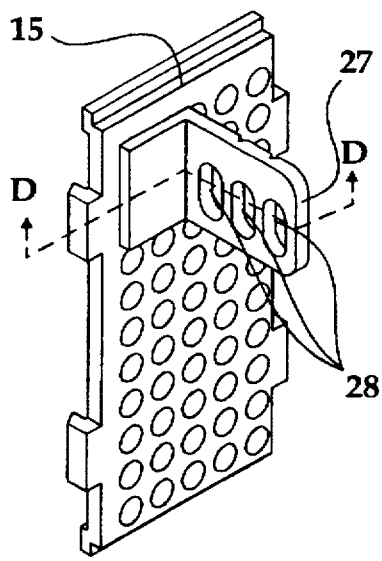
FIGURE 20
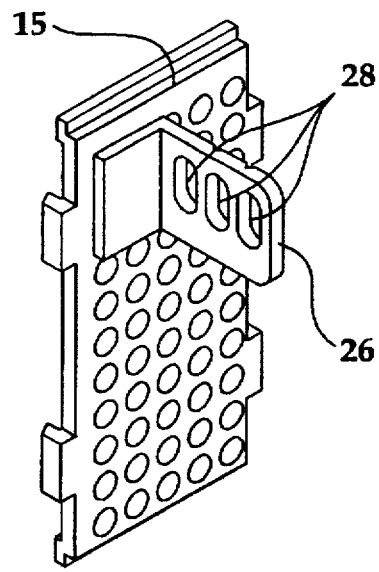
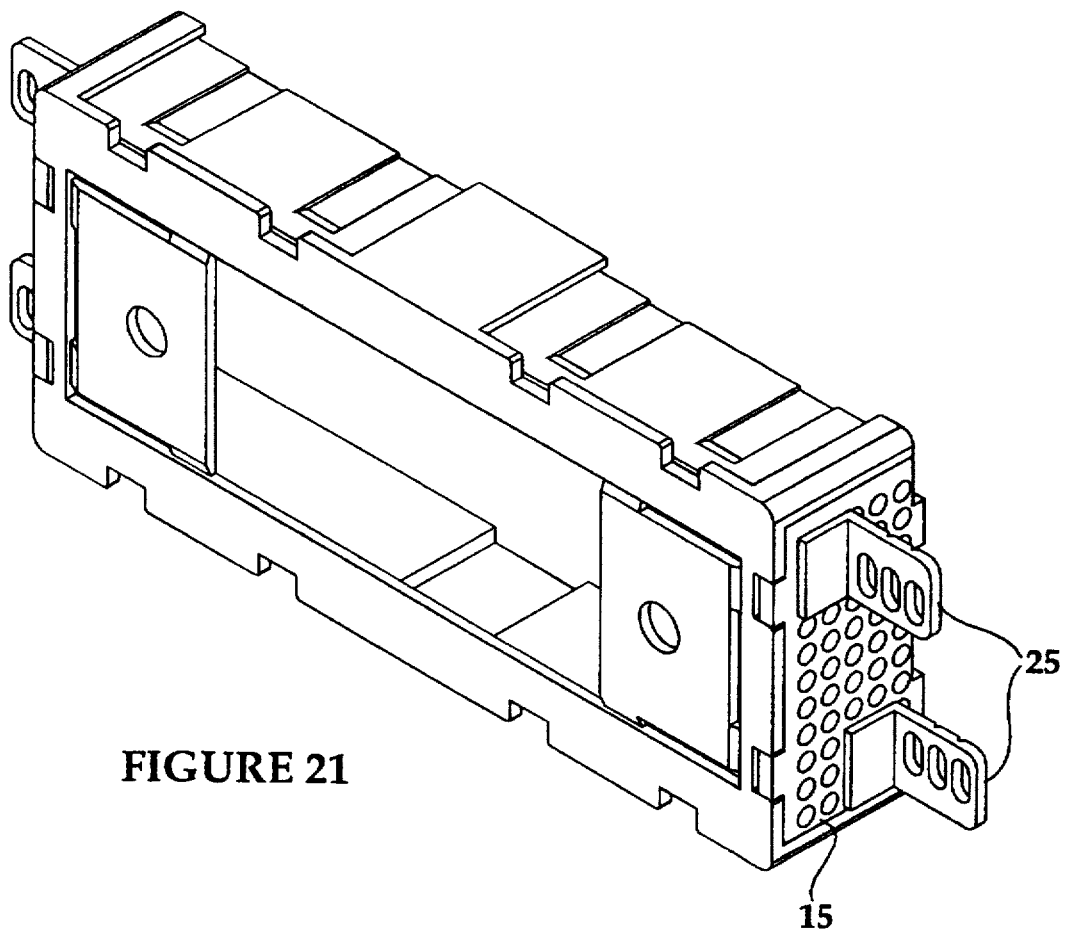
FIGURE 21

FIGURE 27
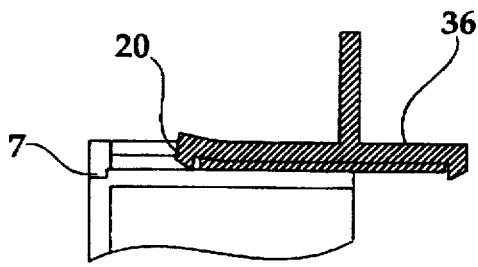
FIGURE 28
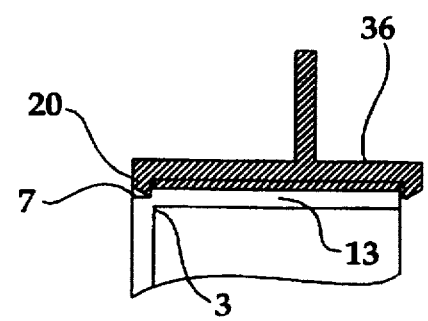
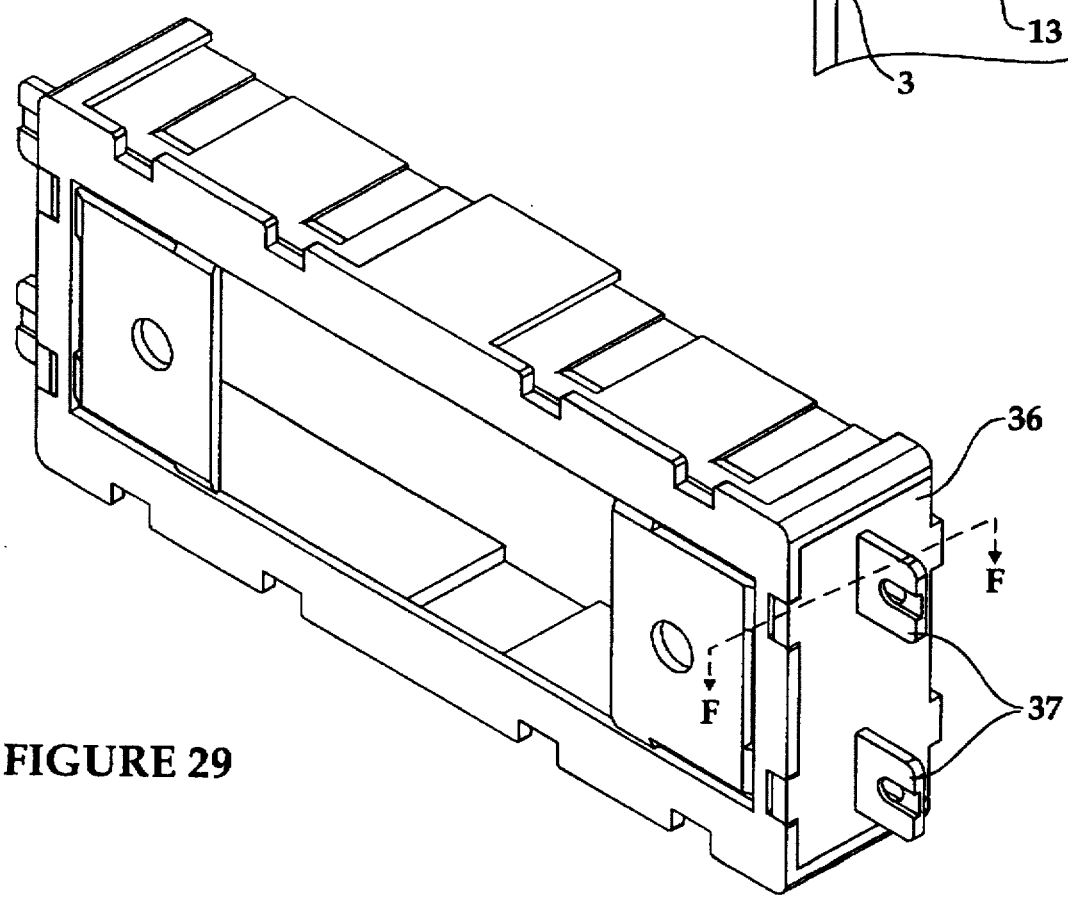
FIGURE 29

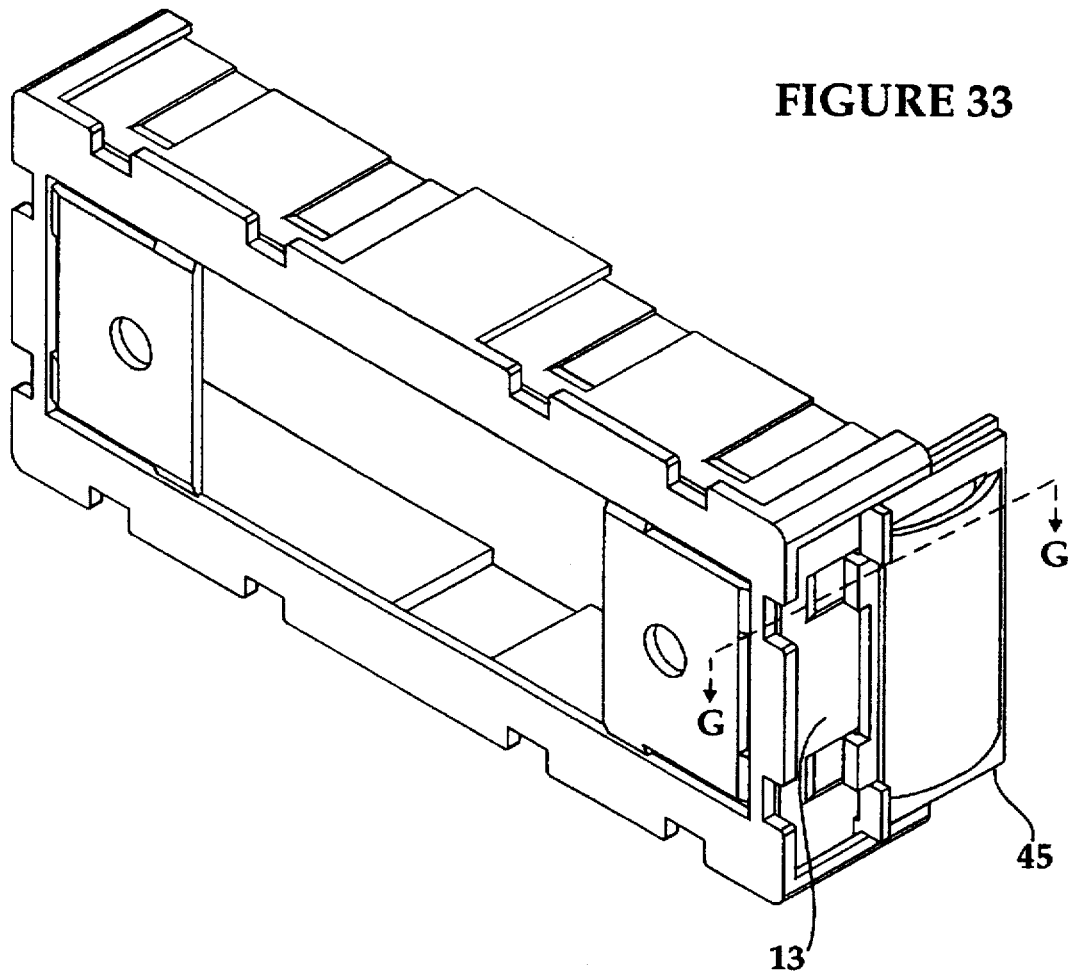
FIGURE 33
FIGURE 34
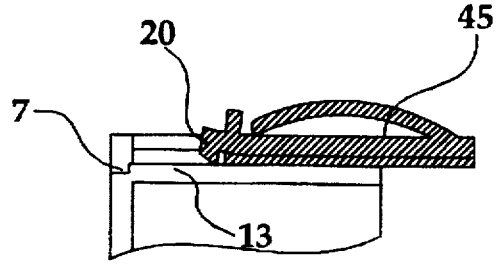
FIGURE 35
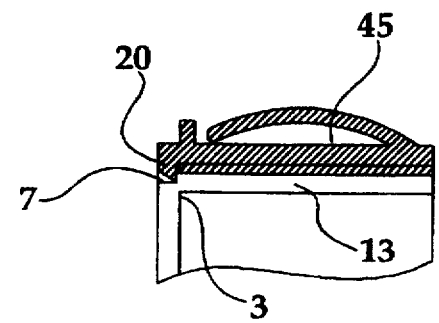

MULTI-USE RADIO INSTALLATION KIT

This application is a Division of application Ser. No. 08/685,985 filed Jul. 22, 1996, now U.S. Pat. No. 5,791,606, issued Aug. 11, 1998.

BACKGROUND OF THE INVENTION

This invention relates to a device used to facilitate the mounting of equipment such as radios and equalizers into a vehicle dash board in the vehicle's original radio location.

Large numbers of consumers wish to have radios installed into their vehicles for many reasons. Their original radio may have been stolen, their vehicle may have come without a radio, or they wish to upgrade their present radio to one of higher audio standards.

Radios are generally installed into vehicles by either a professional radio installer or by a consumer, usually the vehicle owner, or an amateur acquaintance with experience in the field.

Almost every vehicle manufactured is supplied with a radio from the factory, and in the cases where no radio is supplied the manufacturer places a dummy panel in its location. Each of these vehicles differ with respect to the manner in which their radios are mounted; they may utilize mounting brackets attached to the top, bottom or side walls of the radio, which are in turn attached to the vehicle sub-dash, or they may be attached to a dashboard subassembly directly with screws.

These factory radios are of many differing shapes, styles and configurations. The typical aftermarket radios are generally much smaller than the factory radios, having been designed to fit in a multitude of locations. In addition, aftermarket radios are manufactured with several differing mounting provisions and escutcheon shapes and sizes.

Each differing mounting vehicle radio configuration requires a different mounting bracket and trim escutcheon configuration. The differing bracket and escutcheon configurations are referred to as mounting kits in the trade. These kits are generally configured to mount a particular type and style aftermarket radio into a particular type and style vehicle. Many radio installation businesses stock hundreds of mounting kits to insure the ready installation of a radio into any consumers vehicle.

The ease of use of the mounting kit by anybody installing the radio is of paramount concern. If an excessive amount of time is required to assemble the mounting kit professional installers must raise the cost of the installation, and if excessive adjustments must be made to insure a proper fit, then both professional and amateur installers will be frustrated by the procedure.

The cost of the mounting kit must either be absorbed by the radio installer, or be charged to the consumer. In either case the cost must be very low so as to not destroy the installers profit, nor to make the overall cost of the radio and mounting kit prohibitive to the consumer. This latter reason is especially true where the consumer purchases the radio at a store and installs it themself. Many stores rely on a low cost for this very necessary component in order to keep from overburdening the consumer with add ons that become a major portion of the overall radio purchase.

Typically, radio mounting kits are manufactured from injection molded plastic or bent sheet metal. Injection molded plastic parts are less expensive than bent sheet metal parts but are restricted in shapes to those defined by the injection molding process. This process dictates that all features must be perpendicular with the mold parting line, so that holes in walls perpendicular to the parting line must be made with the use of slide tooling; whereby a feature is tooled into a loose portion of the mold which is moved by the mold when it opens and closes. This type of tooling is very expensive, prone to wear and requires considerable time to make.

Several multiple configuration mounting kits have been created to address the problems associated with the large number of individual mounting kits stocked by stores. U.S. Pat. No. 4,462,564 to Alves et al. shows a mounting kit with a frame comprising a flat face to which the radio is mounted and four perpendicular return walls. These walls are provided with slots which proceed from the rear of the flat face out through the rear of each return wall. "L" shaped brackets are provided which have slots through one face and a single hole through the other face. The face with the single hole is placed against one of the return walls on the frame with the hole aligned with one of the slots. A screw is inserted into the single hole and passes through one of the slots in the frame and into a fastener such as a nut on the inside of the return wall. When installed to the frame with the slotted sides sticking out a large number of possible mounting configurations may be attained. However, since the slots are open at the rear it is structurally impossible to place the slots any closer then 19 mm (0.75"). This severely limits the configurations available.

In order to mount this radio kit to differing vehicles, the brackets must be fastened to the return walls in specific locations for each vehicle. This mounting frame is configured for conventional molding and it is impossible to inscribe specific notes or indicia on the faces of the return walls, consequently it is impossible to describe to the installer the proper positioning of the bracket with respect to front to rear location. The printing of a manual with positioning guides is expensive and impractical to supply due to it having to contain positions for hundreds of vehicles. Installers must loosely attach the brackets to the frame and then temporarily mount the kit into the dashboard of the vehicle, and replace removed dashboard components, including the dash bezel. The frame is then pushed or pulled until it is in the proper position. The dash components must be removed again, without disturbing the location of the mounting brackets. The kit is removed and the screws tightened. This procedure takes an inordinate amount of time and is fraught with possibilities for error, such as a small unnoticed movement of the frame which would cause a tilted or recessed radio installation, forcing the removal and reinstallation of the radio.

The fasteners used must be very shallow, as the space between the inside frame and the aftermarket radio may be as little as 1.5 mm (0.05") per side. In addition, the use of the fasteners adds greatly to the cost of the kit.

U.S. Pat. No. 4,738,420 to Angle et al. and U.S. Pat. No. 4,911,386 to Putman et al. both show a mounting kit with a frame comprising a flat face to which the radio is mounted and four perpendicular return walls. These walls are provided with holes in various locations. "L" shaped brackets are provided which have slots through on one face and a single hole through the other face. The face with the single hole is placed against one of the return walls on the frame with the holes aligned with one of the holes. A screw is inserted into the single hole and passes through the hole in the frame and into a fastener such as a nut on the inside of the return wall. When installed to the frame with the slotted sides sticking out a fixed number of possible mounting configurations may be attained. In order to mount this radio kit to differing vehicles the brackets must be fastened to the return walls in specific locations for each vehicle. As the number of holes is limited by the structural strength of the materials on a fixed number of combinations are possible.

The holes are created through the use of slide tooling on all four sides of the mounting frame, which is expensive and adds substantially to the manufacturing cost of the kit. Further, this method requires the use of fasteners which additionally increase the cost.

U.S. Pat. No. 4,699,341 to Ponticelli describes a radio installation kit which utilizes a four sided frame constructed with a multitude of rectangular openings formed upon each side. Numerous accessories, such as brackets, and trim escutcheons are press fit into the openings. The openings are fixed in positions allowing a only a fixed number of combinations with which brackets may be assembled. The frame must be created utilizing slide tooling and the press in accessories require a bonding agent to hold them in place, both of which add substantially to the overall cost of the installation kit.

U.S. Pat. No. 4,742,978 to Ponticelli shows a radio installation kit with a face area where a radio may be mounted and U shaped return rails in the corners. Between the return rails are thin walls which are constructed with square holes adjacent to the rails. Brackets are shown which slide down the U shape rail in such a way as to be held to the rail. A tab is shown on the brackets which will fit into the square holes on the thin walls. A tool is used to slide the bracket down the rail until the correct square hole is located. The structural properties of the thin wall prevent the holes from being closer than 3 mm (0.125"). When the thickness of the bracket is added, the smallest adjustment, front to back, is no less than 6 mm (0.25"). The rails are provided only in the corner areas, allowing a very limited area to which brackets may reach. The square openings must be created with the use of slide tooling.

U.S. Pat. No. 5,106,039 to Gross shows a radio installation kit which is comprised of a mounting frame having a face to which a radio may be mounted and return walls along the edges of the face. The return walls are provided with openings to which ancillary panels may be mounted. These ancillary panels are constructed with keyed openings through which are pushed keyed brackets. The brackets are first pushed through the openings in the panels and then the panels are secured to the frame using mounting hardware.

Several problems present themselves, first only a limited number of keyed openings are possible on any panel to insure its structural strength, consequently many such panels are required. As the openings are in fixed positions the advent of any new, and different vehicle renders the kit obsolete, unless new panels are supplied for the existing kits. This of course is an expensive procedure.

Secondly, the use of fasteners to secure the panels to the frame creates two additional problems, one being the limited amount of space within the kit for the fasteners, and two being the fact that the fastener on the outside of the frame is not always to the front of the bracket: some vehicles have very tight mounting considerations and it is the industry standard to place the fastener for the bracket forward of the bracket to ensure adequate space for it. Positioning the fastener behind the bracket may cause the installer to modify the vehicle in order to fit the kit into the radio cavity.

It is clear from the foregoing that the current state of the art in the field of radio installation kitting has not produced a radio installation kit which is capable of adapting all aftermarket radios to a great variety of automobiles at a reasonable cost.

OBJECTS AND ADVANTAGES

It will be apparent from the foregoing that there exists a need for an improved radio installation kit. The improved radio installation kit being constructed so as to fit the greatest majority of automobiles as well as being capable of being produced for a low monetary amount.

Accordingly, it is the general object of this invention to provide an improved radio installation kit.

It is a further object of the invention to provide a radio installation kit which will fit a great majority of vehicles.

It is a still further objective of the invention to provide a radio installation kit which is inexpensive.

It is another objective of the invention to provide a radio installation kit which requires no assembly hardware.

It is an additional objective of the invention to provide a radio installation kit which is molded using inexpensive, conventional tooling.

It is a still further objective of the invention to provide a radio installation kit which is simple to assemble.

These and other objects, features, and advantages of the present invention will become apparent from the following detailed descriptions of the preferred embodiments that are to be read in conjunction with the accompanying drawings.

SUMMARY OF THE INVENTION

The present invention resides in a radio installation kit, constructed to snap together, without the need of hardware and configurable in such a way that mounting brackets present overlapping mounting boundaries which provide the greatest amount of adaptable mounting positions.

The radio installation kit being capable of mounting all configurations of aftermarket radios in a vast majority of automobiles.

The radio mounting kit also being capable of assembly without assembly hardware and with very simple assembly steps.

The radio mounting kit being constructed of components which are capable of various positioning options to allow a great multiple of installation mounting bracket location combinations.

The same mounting bracket being moldable without the need for expensive slide tooling.

The preferred embodiment of the present invention is constructed with a face which is alternatively adaptable to varying types of aftermarket radio mounting requirements. Radios which mount through the use of threaded shafts are placed with their shafts protruding through oval shaped holes on plates constructed on either side of the face. Nuts are used on the threaded shafts to hold the radio in place. Alternately configured radios such to DIN E or ISO standards are mounted by removing the shaft hole plates and sliding a mounting sleeve which is supplied with the radio into the now much larger, rectangular opening. The mounting sleeve is retained by various aftermarket radio manufacturer supplied methods, usually the mounting sleeve is manufactured with tabs placed longitudinally which are bent manually into contact with the rear of the mounting opening, in this case the rear of the face.

The face of the radio installation kit is provided with return walls which form a frame. The frame is inset from the edge of the frame. This frame is intersected by L shaped extrusions which are formed from the rear of the face to the rear of the frame. The L shaped extrusions are shaped so that the edge of the L which is open is even with the edge of the frame. The combination of the L and the frame wall serve to form grooves. The grooves are formed so that they are facing each other in sets.

In between the grooves a section of the face is relieved so as to be flush with frame.

The frame is formed so that no feature is below another and so can be molded without the use of slide tooling.

Mounting plates are constructed as flat plates which are configured in size to be capable of sliding into the grooves on the frame in only two ways with one flat side of the mounting plate in either groove. On the forward and rear edges of the mounting plate is a outward step which is beveled on both leading sides and blunt on the reverse sides. This step is configured to fit within the relieved area of the face, so that when the mounting plate is slid between the grooves the step is forced into a temporarily strained position and snaps back after it passes the relieved area. Since the step is blunt on the reverse side it prevents the mounting plate from reversing and coming out of the grooves. The plates may be assembled into any position on the frame with either edge facing forward.

The mounting plate is configured with a series of circular openings. These openings are relieved on the inward, frame facing side so as to appear conical in cross section. The positioning of the openings is regular, but the pattern is offset closer to one leading edge. This offset allows the openings to be variably positioned, depending on which side of the frame they are positioned. Likewise the openings are positioned closer to one side to also allow differential positioning through reversing the plates' direction.

The panels are formed so that no feature is below another and so can be molded without the use of slide tooling.

Brackets are supplied which are constructed of an elastic polymer, formed in an "L" shape, with one leg of the "L" being equipped with three studs placed in a triangular fashion. Each of the studs is conically shaped with the smaller end connected to the bracket. The studs are shaped and sized fit the conical openings in the plates. During assembly, the studs are forced through the circular openings. Since the leading edge of the stud is larger than the circular opening, the stud material temporarily deforms and passes through the opening. Once on the other side the material regains its original shape and therefore resists removal. The multitude of circular openings allows the brackets to be forced on at any location. The conical studs are offset from the edge of the "L" bracket so that reversing the bracket changes it position.

The other leg of the "L" is formed with elongated oval openings constructed starting a short distance from the apex of the "L" and terminating a short distance from the end of the leg. Several "V" shaped grooves cross one face the leg perpendicular or parallel to the direction of the oval openings.

The brackets are formed so that no feature is below another and so can be molded without the use of slide tooling.

During a radio installation, the kit would be assembled with a radio mounted to the face; at least two plates mounted to the frame and perhaps several brackets pressed onto the plates. The multitude of circular openings combined with the reversibility of the mounting plates which allow differential positioning of the circular opening in two axis, allows the brackets to be positioned with great flexibility, ensuring that virtually any radio mounting position may be attained.

A further embodiment of the invention would include the same face and frame configuration with mounting plates formed with fixed brackets for various automobiles. These brackets may be supplied with more than one vehicle represented on each mounting plate, where the excess brackets may be removed easily.

These plates are constructed so that the opening through which a mounting screw is used to secure the kit to the vehicle are formed as slots which penetrate the face of the mounting plate and so no slide tooling is required for the mounting plate manufacture.

In a still further embodiment the mounting plates are formed with a "C" shaped appendages, which are attached at the rear edge to the plate and free at the opposite edge. When the mounting plates are installed to the frame the "C" protrudes above the perimeter of the face. The assembly may be pushed into a dashboard opening with the appendage acting as a tension spring on each side holding the kit in place. In certain vehicles the appendage will push fully through a dash opening and will provide clamping pressure to the rear of the dash opening, and hold the kit in place.

DESCRIPTION OF THE DRAWINGS

FIG. 12 is a cross section view B—B found in FIG. 11, of a snap under tension.

FIG. 13 is a cross section view C—C, found in FIG. 14, of a relaxed snap.

FIG. 14 is a perspective view of a mounting plate fully insert into frame with conical openings positioned below the center of the frame.

FIG. 19 is a perspective view of a bracket assembled with elongated openings formed below the center of the bracket.

FIG. 20 is a perspective view of a bracket assembled with elongated openings formed above the center of the bracket.

FIG. 21 is a perspective view of an assembled kit.

FIG. 27 is a cross section view E—E, found in FIG. 26, of another embodiment of the invention, of a snap under tension.

FIG. 28 is a cross section view F—F, found in FIG. 29, of another embodiment of the invention, of a relaxed snap.

FIG. 29 is a perspective view of another embodiment of the invention of an assembled kit.

FIG. 33 is a perspective view of yet another embodiment of the invention of mounting plate partially inserted onto frame.

FIG. 34 is a cross section G—G, found in FIG. 33, of yet another embodiment of the invention, of a snap under tension.

FIG. 35 is a cross section view H—H, found in FIG. 36, of yet another embodiment of the invention, of a relaxed snap.

DESCRIPTION OF THE PREFERRED EMBODIMENTS

Figure 1:
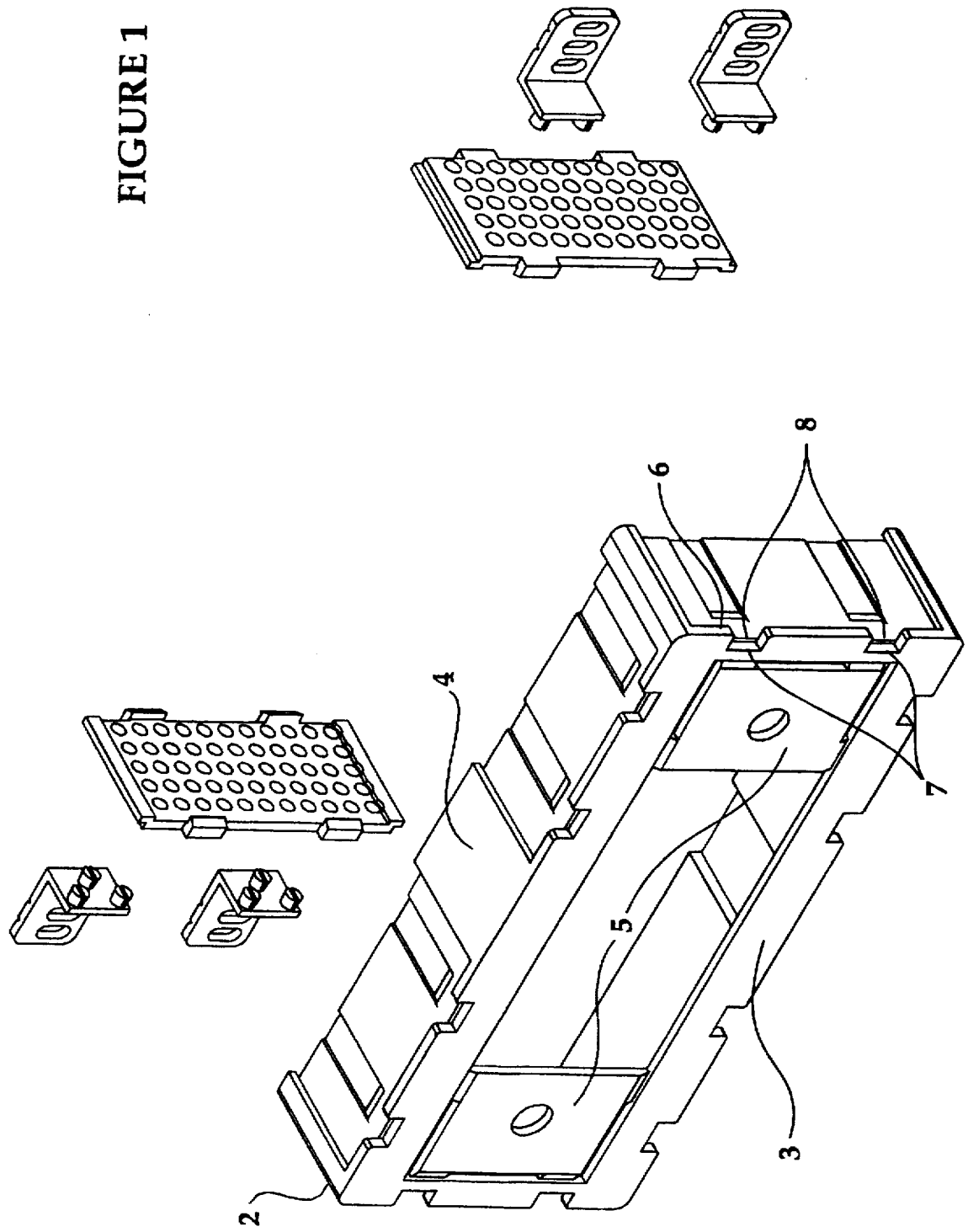
FIG. 1 is a perspective view of a radio installation kit.

As shown in the drawings for the purposes of illustration, the present invention is embodied in a radio installation kit, as shown in FIG. 1, of rectangular proportions.

Static Description

The preferred embodiment of the invention is described with reference to FIGS. 1–9.

Figure 2:
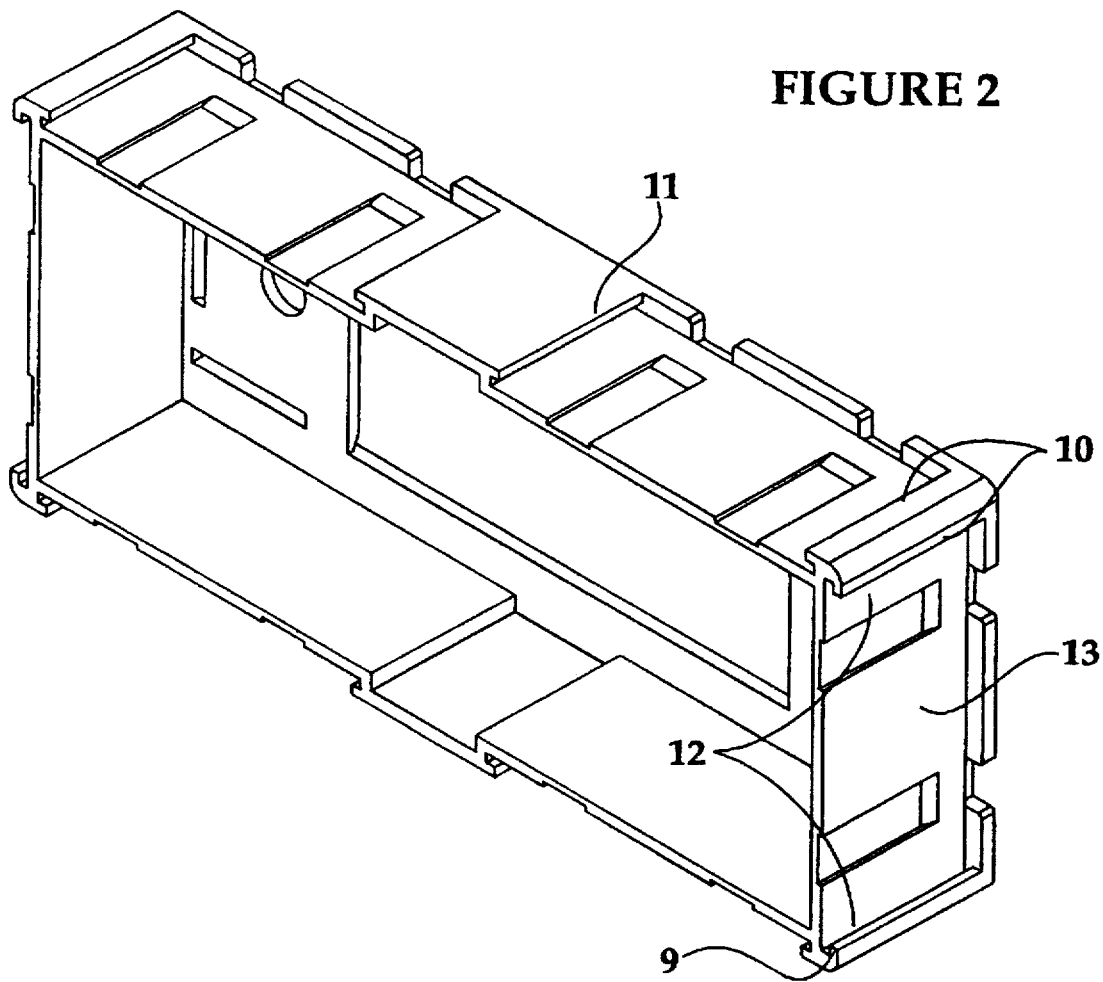
FIG. 2 is a perspective view of an "L" shaped rib of a return wall of the frame.

In accordance with the invention, a radio installation kit, as shown in FIG. 1, is constructed utilizing a frame 2 which is comprised of a face 3, and return walls 4. The face 3 is provided with a receptacle area 5 utilized to mount an aftermarket radio (not shown). The return walls 4 are set back from the face edges 6. Reliefs 7 are provided at twelve locations on the face edges 6. These reliefs 7 create openings 8 in the return walls 4. Return walls 4 are constructed with "L" shaped ribs 9, as shown in FIG. 2. The "L" shaped ribs 9 are placed at each corner 10 and toward the centers of the longer return walls 11. The "L" shaped ribs 9 are placed so that the open side 12 of the "L" shaped rib 9 is facing the open side 12 of an opposing "L" shaped rib 9 so as to form a pocket 13.

The frame 2, is formed so that all features, including the return walls 4, reliefs 7, openings 8, and "L" shaped ribs 9 are perpendicular to the face, with no features being under another, so that injection mold tooling is constructed without the use of slides.

Figure 3:
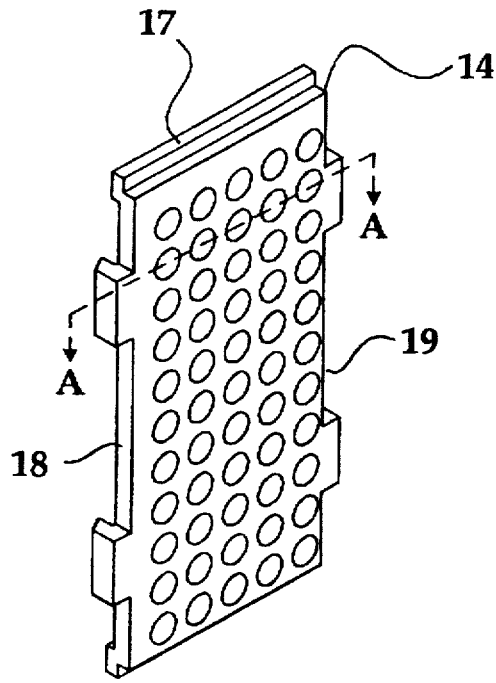
FIG. 3 is a perspective view of a mounting plate.
Figure 4:
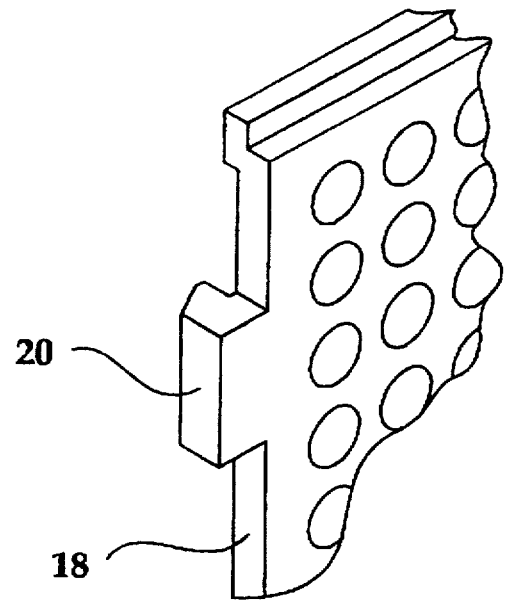
FIG. 4 is a perspective view of a mounting plate snap.

Mounting plates 14, as shown in FIG. 3, are constructed to slide into the pockets 13, provided on the frame 2. Two opposing mounting plate edges 17 are of reduced thickness to fit beneath the "L" shaped ribs 9. The remaining two edges, 18 and 19 are formed with snaps 20, as shown in FIG. 4. The snaps 20 are configured to fit within reliefs 7.

Figure 5:
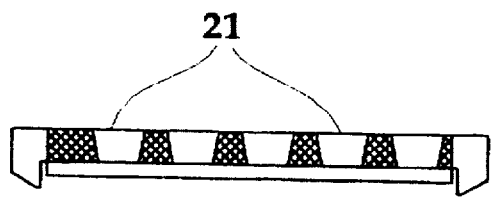
FIG. 5 is a cross section view A—A, found in FIG. 3, of conical openings in mounting plate.
Figure 6:
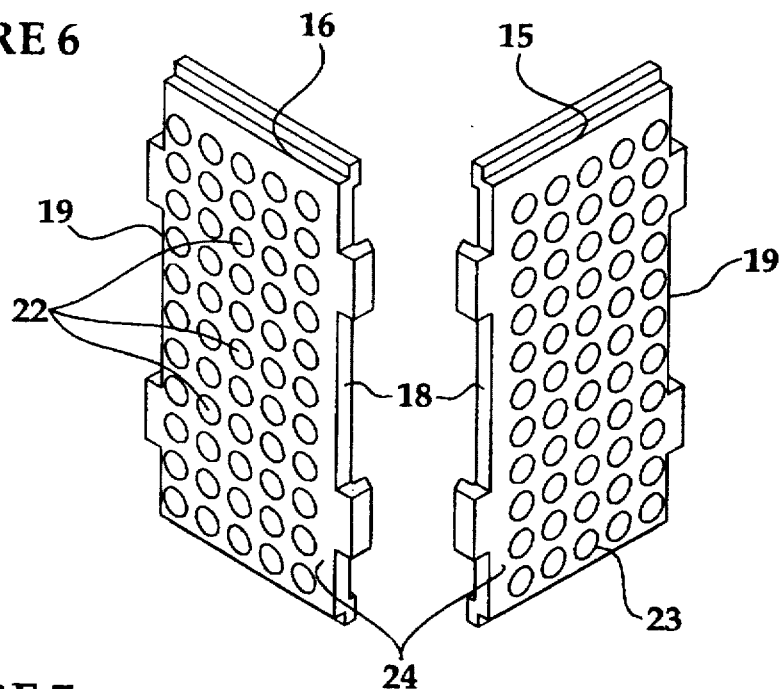
FIG. 6 is a view of opposing mounting plates.

Conically shaped openings 21, as shown in cross section, A—A, in FIG. 5, are formed through the mounting plates 14 in an offset pattern 22. The pattern 22 is mirror imaged on opposing mounting plates 15 and 16, as shown in FIG. 6. The conically shaped openings are provided with a lead in chamfer 23.

Mounting plates 14 are formed so that all features are perpendicular to one face 24, so that the injection mold tooling is constructed without the use of slides.

Figure 7:
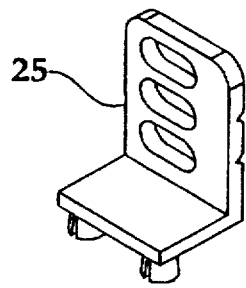
FIG. 7 is a perspective view of a bracket.
Figure 8:
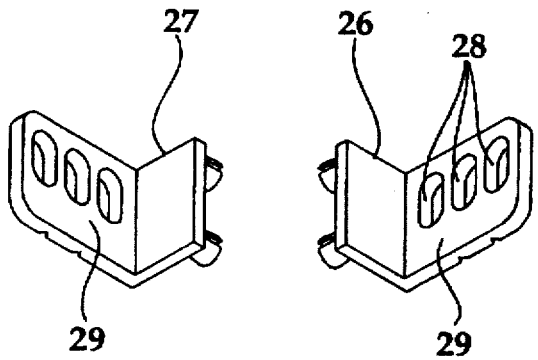
FIG. 8 is a view of opposing brackets.

Brackets 25, as shown in FIG. 7, are "L" shaped and are constructed in opposing pairs such as brackets 26, and 27 as shown in FIG. 8. Each bracket 25 is constructed with elongated openings 28 formed in one leg 29. The elongated openings 28 are formed off center so that bracket 26 has elongated openings 28 above center and bracket 27 has elongated openings 28 below center.

Figure 9:
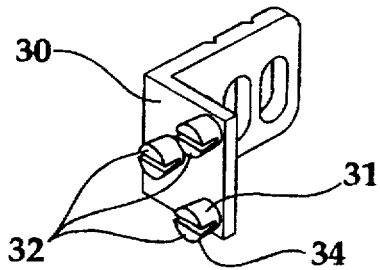
FIG. 9 is a perspective view of a bracket leg showing conical studs in triangular array.

The other leg 30, as shown in FIG. 9, is formed with three conical studs 31, constructed in a triangular array 32. Each conical stud, 31 is shaped with a lead in chamfer 34.

All features of the brackets 25 are formed perpendicular to leg 29 with no feature being beneath another so that the injection mold tooling (not shown) is constructed without the use of slides.

Description of Operation

The operational description of the preferred embodiment of the current invention is described with reference to FIGS. 10–21.

Figure 10:
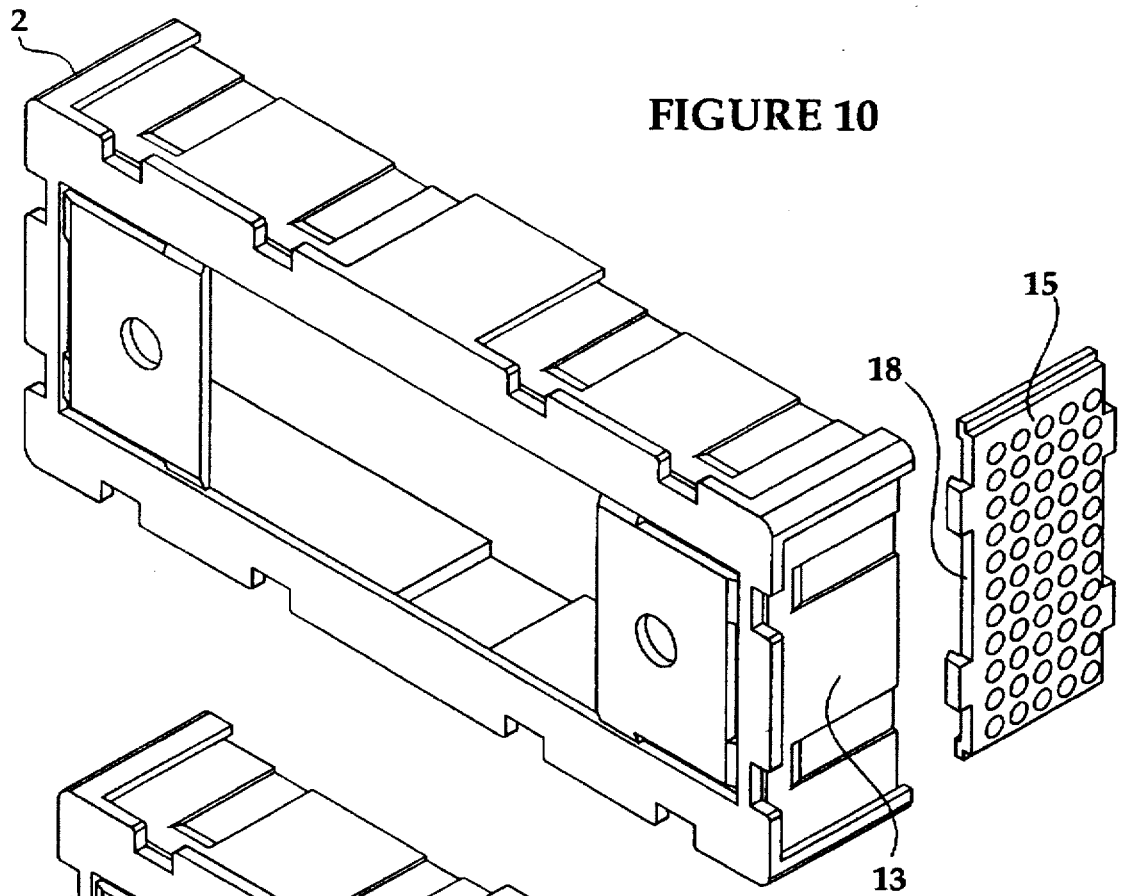
FIG. 10 is a perspective view of a mounting plate positioned for insertion onto frame.
Figure 11:
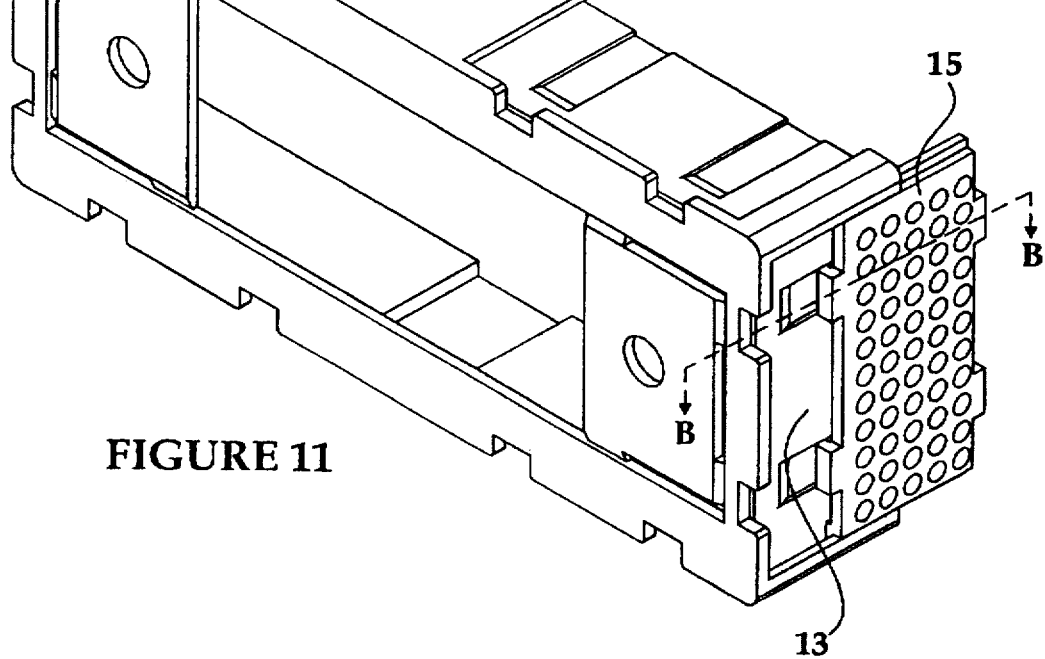
FIG. 11 is a perspective view of mounting plate partially inserted onto frame.

Plate 15, shown in FIG. 10 is positioned to slide into pocket 13 on frame 2 with edge 18 being placed into pocket 13. This positioning is solely for the purposes of illustration, and should not be construed as the primary positioning of plate 15. As plate 15 is slid into pocket 13, shown in FIG. 11, snap 20 is forced to bend, as shown in cross section B—B in FIG. 12.

Plate 15 is pressed into pocket 13 until edge 18 contacts the rear of the face 3, which prevents further forward travel. Snap 20 returns to its natural position into when it reaches relief 7, preventing plate 15 from sliding back out of the pocket 13, as shown in cross section C—C, in FIG. 13.

Figure 15:
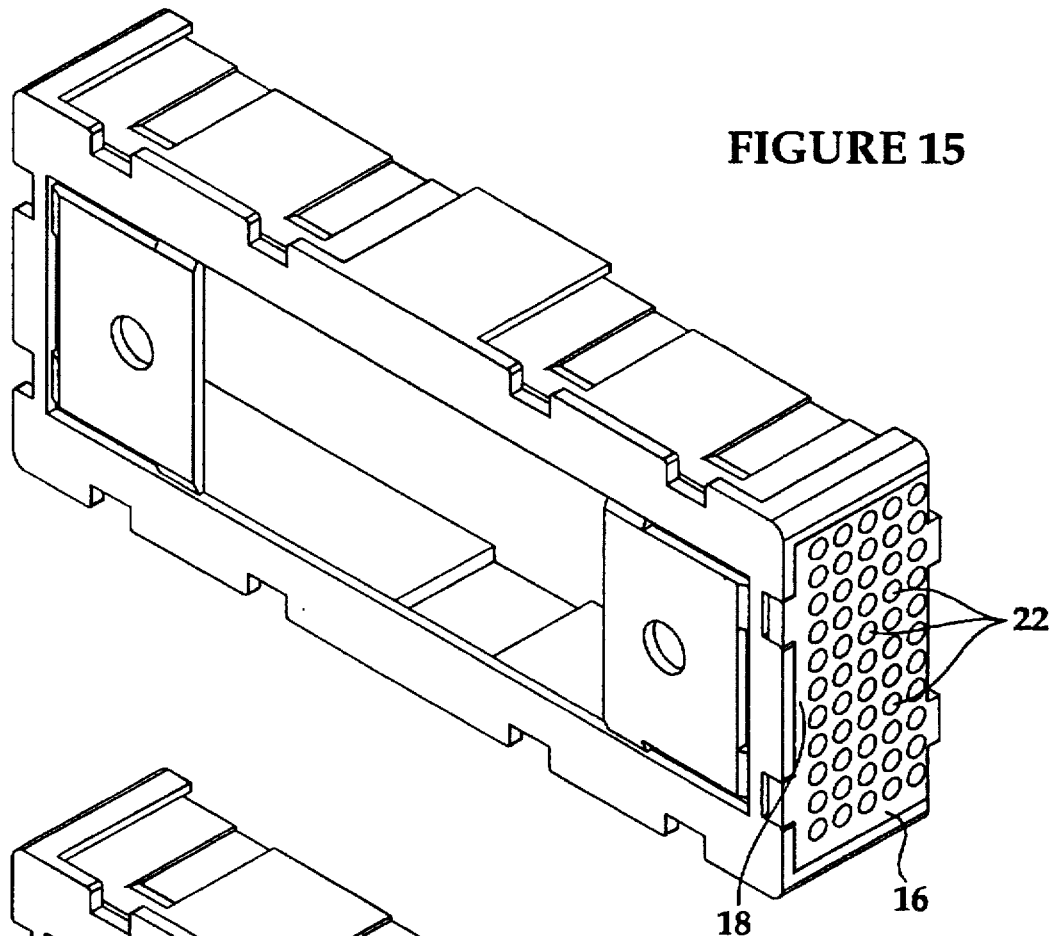
FIG. 15 is a perspective view of a mounting plate fully inserted into frame with conical openings positioned above the center of the frame.

The offset pattern 22 is structured is such a way that when the mounting plate 15 is installed into pocket 13 with edge 18 facing forward, as shown in FIG. 14, the pattern 22 is slightly below center, and when the mounting plate 16 is installed into pocket 13 with edge 18 facing forward, as shown in FIG. 15, the pattern 22 is slightly above center.

Figure 16:
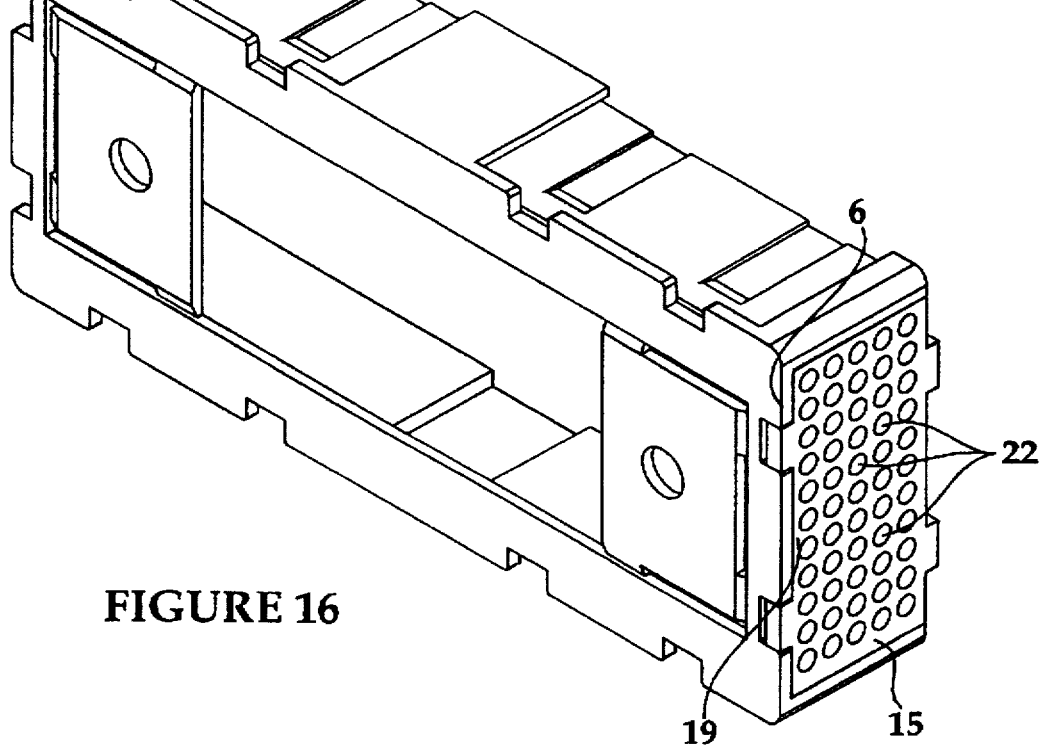
FIG. 16 is a perspective view of a mounting plate fully inserted into frame with conical openings positioned closer to the face edge of the frame.
Figure 17:
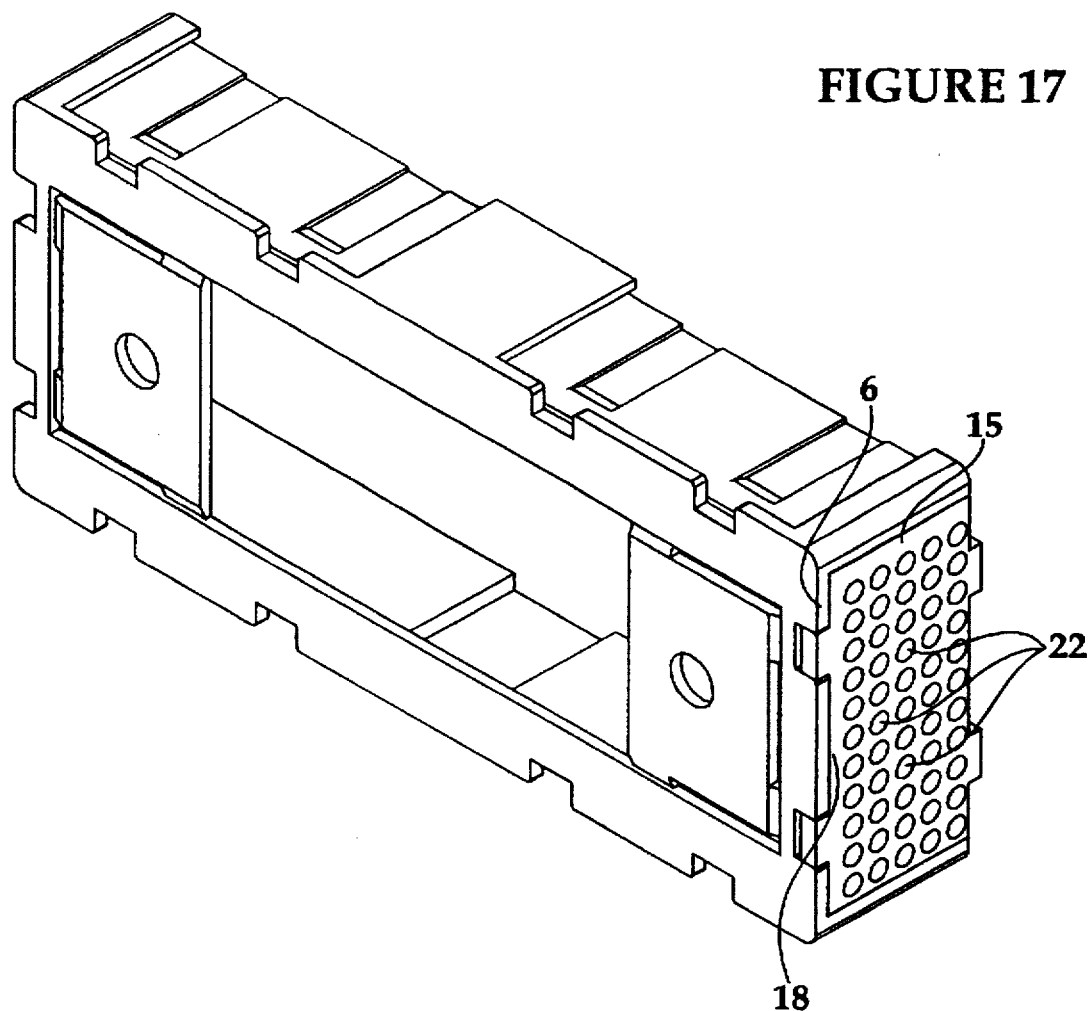
FIG. 17 is a perspective view of a mounting plate fully inserted into frame with conical openings positioned further from the face edge of the frame.
Figure 18:
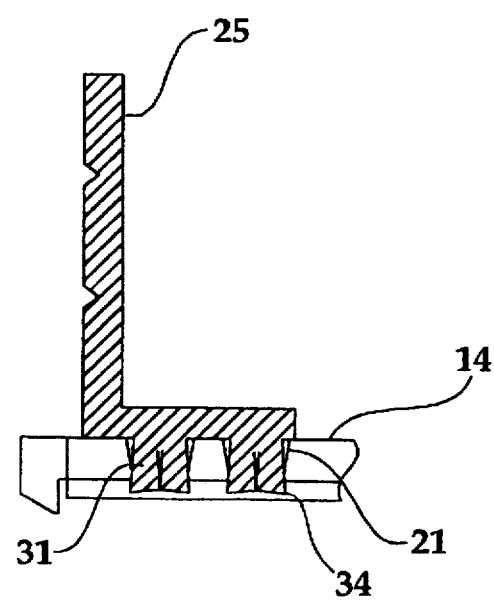
FIG. 18 is a cross section view D—D, found in FIG. 19, of conical studs assembled through conical openings in mounting plate.

Pattern 22 is offset front to rear so that when the mounting plate 15 is installed into pocket 13 with edge 19 facing forward, as shown in FIG. 16, the pattern 22 is slightly closer to the face edge 6, then when the mounting plate 15 is installed into pocket 13 with edge 18 facing forward, as shown in FIG. 17, the pattern 22 is slightly further from face edge 6.

The conical studs 31 on bracket 25 are formed to match the conical openings 21 on mounting plates 14. Bracket 25 is placed against mounting plate 14 with the conical studs 31 aligned with the conical openings 21. Chamfer 34 of the conical studs 31 will be in contact with lead in chamfer 23. Pressing on bracket 25 with mounting plate 14 being held stationary will cause temporary distortion of the form of the conical studs 31 and the conical openings 21. This distortion is such that the conical studs 31 will pass through conical openings 21. The elastomeric property of the molded plastic causes the conical studs 31 and the conical openings 21 to regain their shape after this passage, shown in cross section D—D in FIG. 18.

When bracket 27 is installed onto plate 15, as shown in FIG. 19, elongated openings 28 are below center and when bracket 26 is installed onto plate 15, as shown in FIG. 20, elongated openings 28 are above center.

FIG. 21 shows kit fully assembled, for the purpose of illustration. This configuration may be easily changed by switching the position of mounting plates 15 and 16 or by mounting the brackets 25 into differing positions.

FIXED BRACKET EMBODIMENT

A further embodiment of the invention is described with reference to FIGS. 22–23

Static Description

Figure 22:
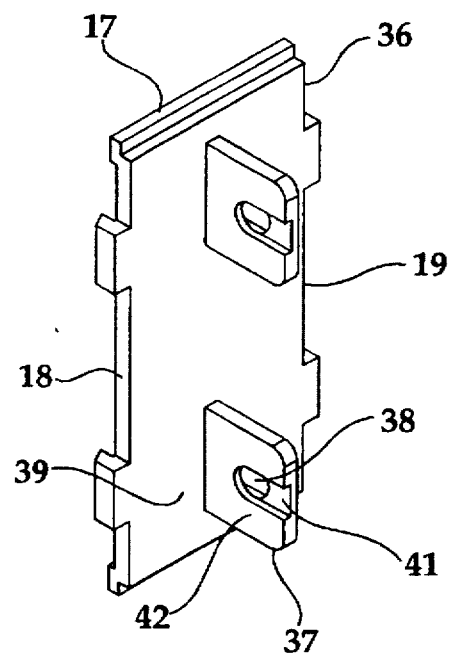
FIG. 22 is a perspective view of another embodiment of the invention of a mounting plate.
Figure 23:
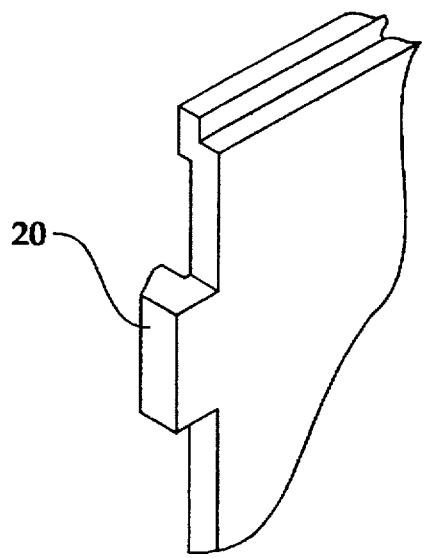
FIG. 23 is a perspective view of another embodiment of the invention of a mounting plate snap.

Also in accordance with the invention, as shown in FIG. 22, mounting plate 36 is formed to slide into the pockets 13, provided on the frame 2. Two opposing mounting plate edges 17 are of reduced thickness to fit beneath the "L" shaped ribs 9. The remaining two edges, 18 and 19 are formed with snaps 20, as shown in FIG. 23. The snaps 20 are configured to fit within reliefs 7.

Figure 24:
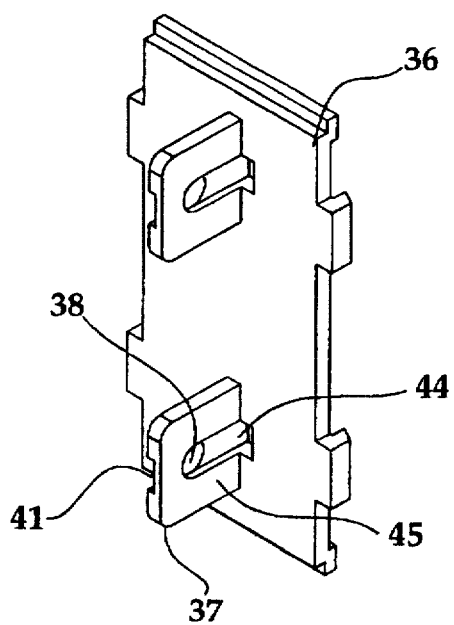
FIG. 24 is a perspective rear view of another embodiment of the invention of a mounting plate.

Mounting brackets 37 are formed perpendicular to the mounting plate 36 so as to be molded in a conventional manner. Each mounting bracket 37 is formed with a hole 38 perpendicular to the mounting bracket face 39. The hole 38 is constructed by forming two grooves 41 and 44 on the mounting bracket 37. Front groove 41 is formed on the front face 42 of the mounting bracket 37 to depth of ½ of the thickness of the mounting bracket 37. Front groove 41 extends from the hole 38 location off of the bracket 37 perpendicular to the mounting plate 36. As shown in FIG. 24, rear groove 44 is formed on the rear face 45 of the mounting bracket 37 to a depth of ½ of the thickness of the mounting bracket 37. Rear groove 44 extends from the hole 38 through the mounting plate 36, perpendicular to the mounting plate 36. Hole 38 is formed by the overlap of front groove 41 and rear groove 44, which are both formed perpendicular to the mounting plate 36 so as to be molded in a conventional manner.

Description of Operation

The operational description of the additional embodiment of the current invention is described with reference to FIGS. 25–29.

Figure 25:
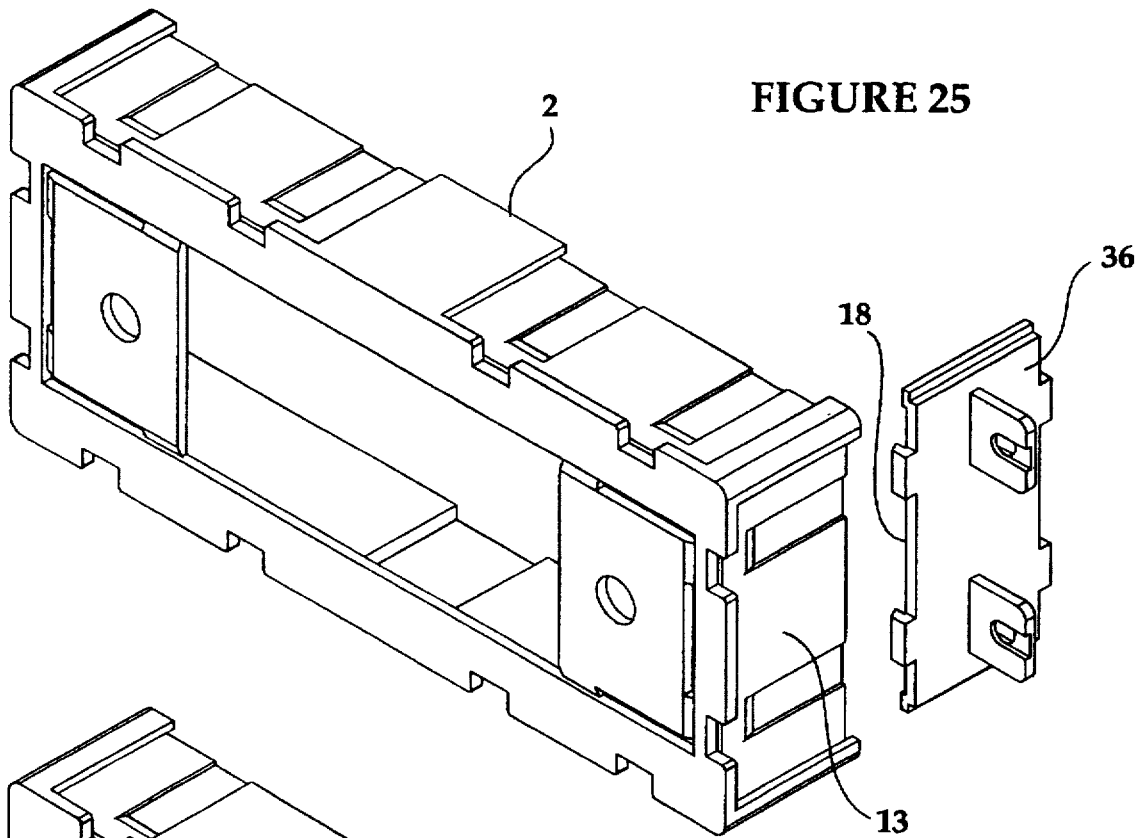
FIG. 25 is a perspective view of another embodiment of the invention of a mounting plate positioned for insertion onto frame.
Figure 26:
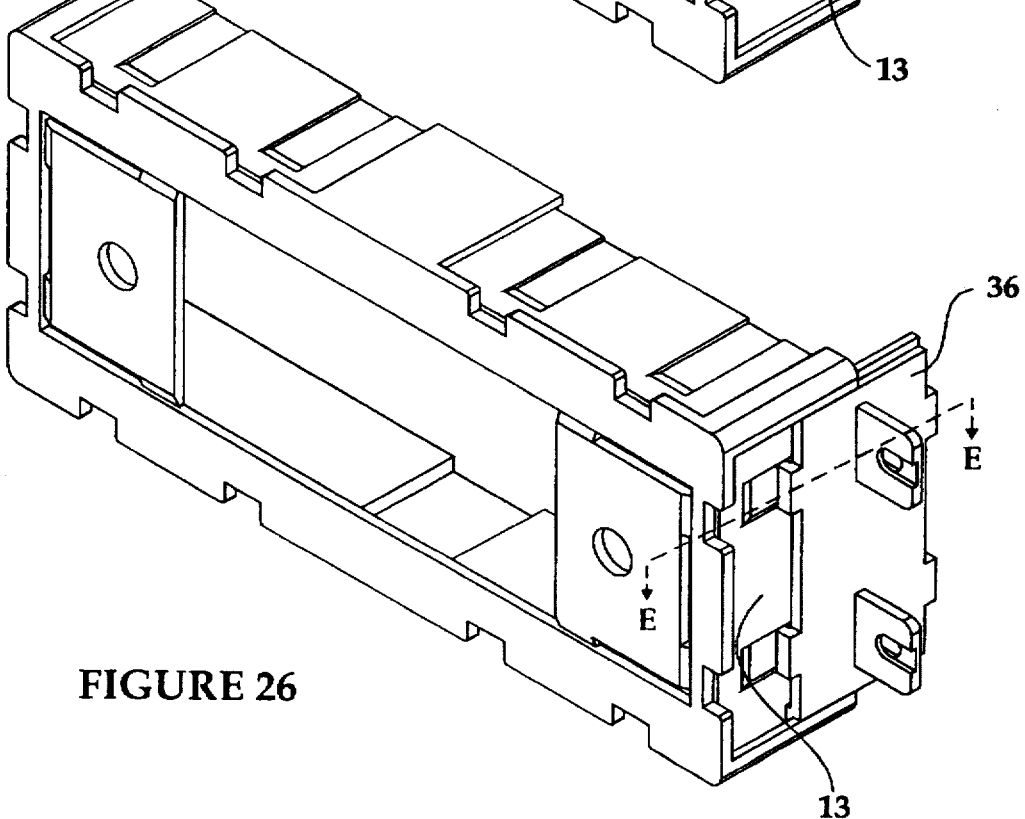
FIG. 26 is a perspective view of another embodiment of the invention of mounting plate partially inserted onto frame.

Mounting plate 36, shown in FIG. 25 is positioned to slide into pocket 13 on frame 2 with edge 18 being placed into pocket 13. As mounting plate 36 is slid into pocket 13, shown in FIG. 26, snap 20 is forced to bend, as shown in cross section E—E, in FIG. 27.

Mounting plate 36 is pressed into pocket 13 until edge 18 contacts the rear of the face 3, which prevents further forward travel. Snap 20 returns to its natural position into when it reaches relief 7, preventing plate 36 from sliding back out of the pocket 13, as shown in cross section F—F in FIG. 28.

FIG. 29 shows kit fully assembled with Mounting plates 35. The position of mounting brackets 37 is predetermined to fit a particular vehicle dash cavity (not shown). Various vehicles will call for varying configurations.

SPRING BRACKET EMBODIMENT

A further embodiment of the invention is described with reference to FIGS. 30–31.

Static Description

Figure 30:
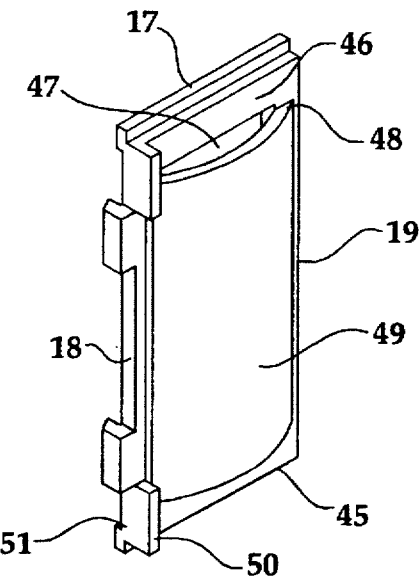
FIG. 30 is a perspective view of yet another embodiment of the invention of a mounting plate.
Figure 31:
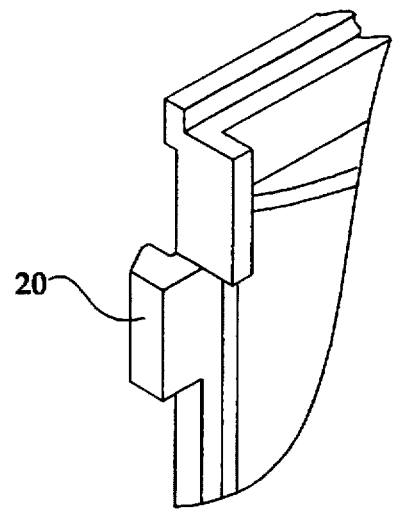
FIG. 31 is a perspective view of yet another embodiment of the invention of a mounting plate snap.

Also in accordance with the invention, as shown in FIG. 30, mounting plate 45 is formed to slide into the pockets 13, provided on the frame 2. Two opposing mounting plate edges 17 are of reduced thickness to fit beneath the "L" shaped ribs 9. The remaining two edges, 18 and 19 are formed with snaps 20, as shown in FIG. 31. The snaps 20 are configured to fit within reliefs 7.

The plate face 46 is formed with opening 47. Edge 48 of opening 47 is connected to "C" shaped protrusion 49. Extensions 50 are formed at the forward edge 51 of plate 45.

Description of Operation

The operational description of the additional embodiment of the current invention is described with reference to FIGS. 32–39.

Figure 32:
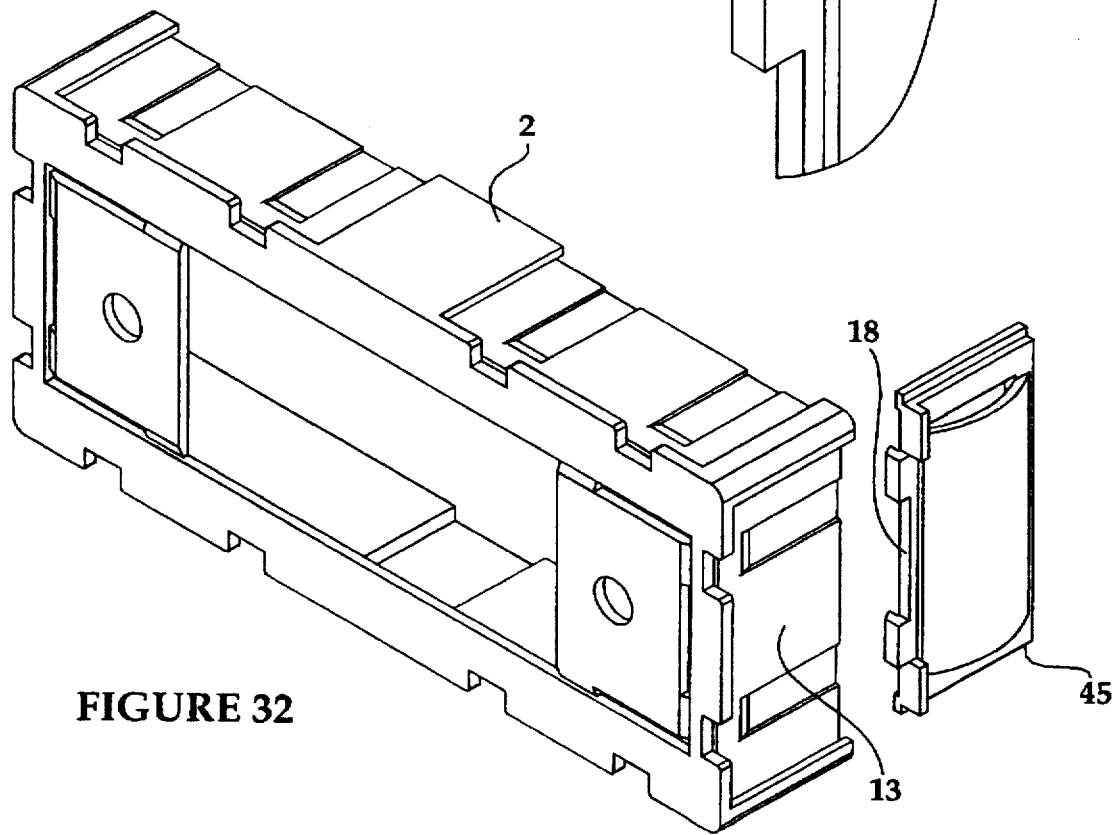
FIG. 32 is a perspective view of yet another embodiment of the invention of a mounting plate positioned for insertion onto frame.

Mounting plate 45, shown in FIG. 32 is positioned to slide into pocket 13 on frame 2 with edge 18 being placed into pocket 13. As mounting plate 45 is slid into pocket 13, shown in FIG. 33, snap 20 is forced to bend, as shown in cross section G—G, in FIG. 34.

Mounting plate 45 is pressed into pocket 13 until edge 18 contacts the rear of the face 3, which prevents further forward travel. Snap 20 returns to its natural position into when it reaches relief 7, preventing plate 45 from sliding back out of the pocket 13, as shown in cross section H—H, in FIG. 35.

Figure 36:
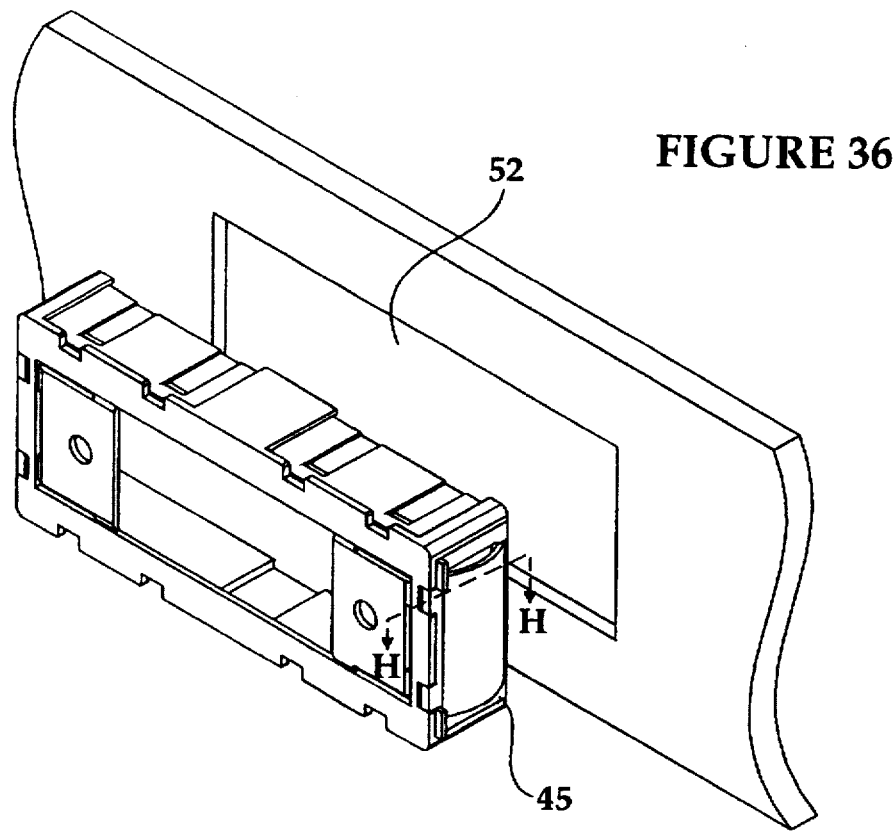
FIG. 36 is a perspective view of yet another embodiment of the invention of an assembled kit and dash opening.
Figure 37:
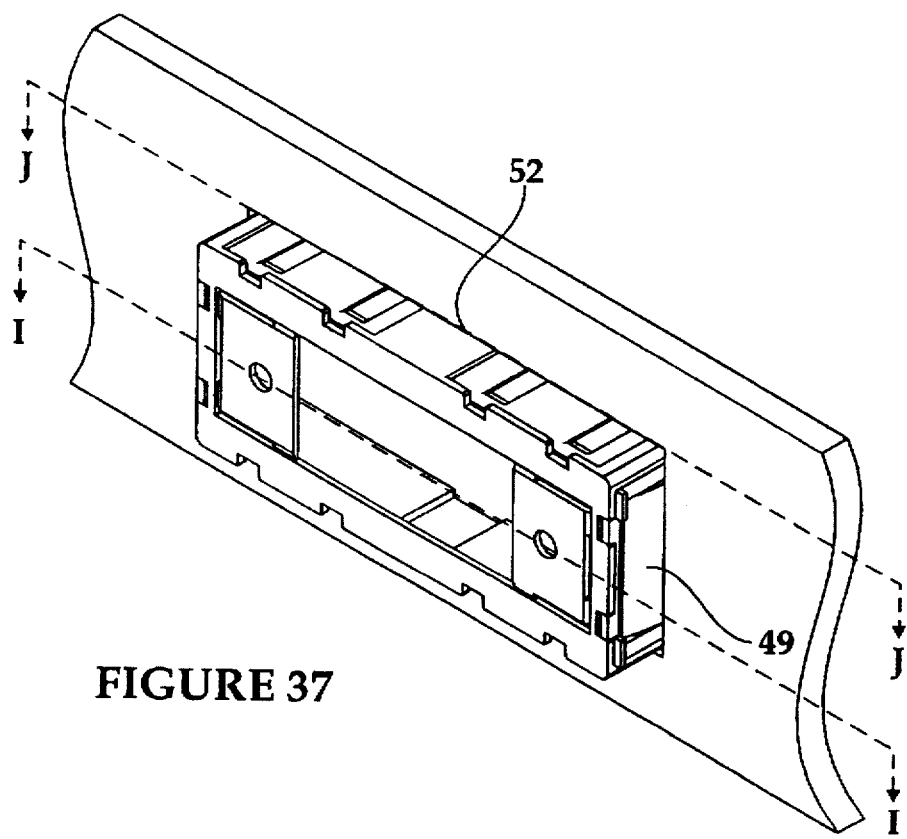
FIG. 37 is a perspective view of yet another embodiment of the invention of an assembled kit partially inserted into dash opening.
Figure 38:
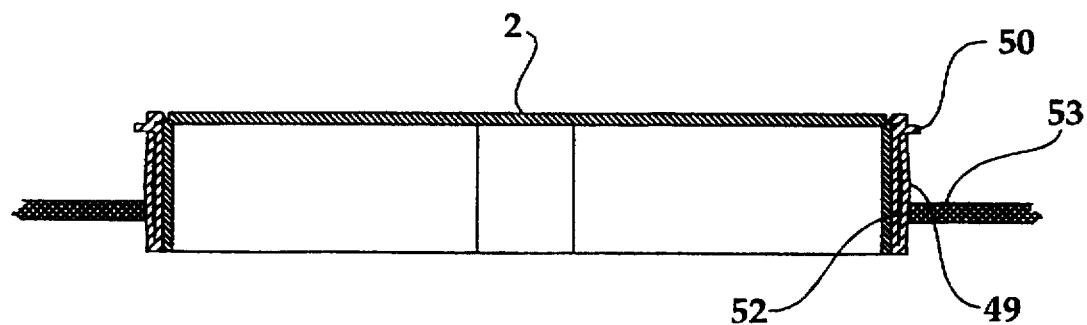
FIG. 38 is a cross section view I—I, found in FIG. 37, of yet another embodiment of the invention, of an assembled kit partially inserted into dash opening.
Figure 39:
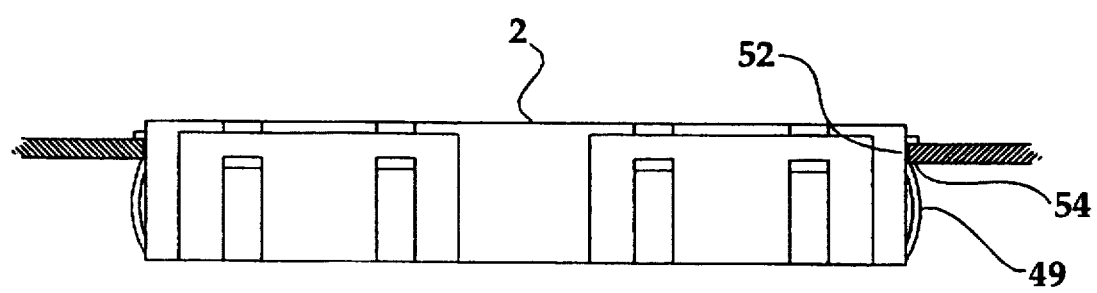
FIG. 39 is a cross section view J—J, found in FIG. 37, of yet another embodiment of the invention, of an assembled kit fully inserted into dash opening.

FIG. 36 shows kit assembled with mounting plates 45 outside of a rectangular dash opening 52. Kit is pressed into rectangular dash opening 52. FIG. 37 shows kit in transmission through rectangular dash opening 52. "C" shaped protrusion 49 is compressed by transmission through the rectangular dash opening 52 as shown in cross section I—I, in FIG. 38. Kit is transmitted through rectangular dash opening 52 until stop when extensions 50 contact the outside of dash panel 53. FIG. 39 shows a cross section J—J, of kit fully inserted into rectangular dash opening 52. "C" shaped protrusion 49 is compressed against edges 54 of rectangular dash opening 52 preventing kit from reversing direction.

CONCLUSIONS, RAMIFICATIONS, AND SCOPE

It will be appreciated from the foregoing description the present invention represents a significant advance in the installation of radios in automobiles. In particular it provides for an inexpensive, easy to use means for quickly assembling a radio installation kit which fits a variety of vehicles simply. This is accomplished by providing a variety of mounting options created to use simple frame with snap together components, all of which are manufacturable without the need for expensive slide tooling.

In addition, the present invention provides a method whereby as yet unmade vehicles can be fit without the need for additional tooling.

It will also be appreciated that, although specific embodiments of the present invention have been described here for the purposes of illustration, various modifications may be made, such as utilization of square holes instead of conical holes, or placing the holes onto the bracket and the studs onto the plates.

It will be further appreciated that the embodiments of the present invention described here for purposes of illustration are described with radios in current production and that future radio design will call for further embodiments.

These and other embodiments are possible without departing from the spirit and scope of novel concepts of the present invention so that the scope of the present invention should be determined by the appended claims only.

I claim:

1. A radio installation kit comprising:

a frame constructed with: a face and at least one return wall, said face having a relieved area at the intersection of said return wall, said return wall being recessed from an edge of said face, and having at least two substantially parallel ribs, said ribs having a portion which overhangs said return wall;

a mounting plate, said mounting plate having two edges formed to fit within said overhanging section of said ribs, another two edges with retaining means which interface with said relieved area of said frame, and at least one protrusion formed substantially perpendicular to said mounting plate.

2. The radio installation kit of claim 1, wherein said protrusion on said mounting plate is formed with at least one opening.

* * * * *